(12) United States Patent
Sehnal

(10) Patent No.: US 8,097,195 B2
(45) Date of Patent: Jan. 17, 2012

(54) METHOD FOR ENERGY USAGE WHEN COOLING EXTRUSION PROFILES

(75) Inventor: Erik Sehnal, Baden (AT)

(73) Assignee: Battenfeld-Cincinnati Austria GmbH, Vienna (AT)

( * ) Notice: Subject to any disclaimer, the term of this patent is extended or adjusted under 35 U.S.C. 154(b) by 0 days.

(21) Appl. No.: 12/677,997

(22) PCT Filed: Oct. 17, 2008

(86) PCT No.: PCT/EP2008/064081
§ 371 (c)(1),
(2), (4) Date: Jun. 9, 2010

(87) PCT Pub. No.: WO2009/053319
PCT Pub. Date: Apr. 30, 2009

(65) Prior Publication Data
US 2010/0308493 A1 Dec. 9, 2010

(30) Foreign Application Priority Data
Oct. 23, 2007 (DE) .......................... 10 2007 050 949

(51) Int. Cl.
*B29C 47/88* (2006.01)
(52) U.S. Cl. .................. 264/179; 264/40.6; 264/177.19; 264/211.12; 264/211.18; 264/234
(58) Field of Classification Search .................. None
See application file for complete search history.

(56) References Cited

U.S. PATENT DOCUMENTS

| 4,573,893 A | 3/1986 | Waters et al. |
| 5,505,058 A | 4/1996 | Dorninger |
| 5,514,325 A | 5/1996 | Pürstinger |
| 7,011,509 B2 | 3/2006 | Klein |

FOREIGN PATENT DOCUMENTS

| DE | 1809285 A1 | 6/1970 |
| DE | 8805979 UI | 10/1988 |
| DE | 19709895 A1 | 12/1997 |
| DE | 19745843 A1 | 4/1998 |
| DE | 10109958 C1 | 4/2002 |
| EP | 0659537 A2 | 6/1995 |
| FR | 2322724 A1 | 4/1977 |

OTHER PUBLICATIONS

International Search Report of PCT/EP2008/064081, mailed on Feb. 13, 2009.

*Primary Examiner* — Monica A Huson
(74) *Attorney, Agent, or Firm* — Hamilton, Brook, Smith & Reynolds, P.C.

(57) ABSTRACT

The invention relates to a method for energy usage during the cooling of extrusion profiles, preferably pipes, wherein energy is supplied in the form of heat for melting the plastic and heat is withdrawn from the plastic again for shaping at least in the devices of mold, calibration, and cooling bath until the plastic is self-supporting. According to the invention, it is provided that a coolant medium runs through the extrusion line opposite to the extrusion direction for cooling, the medium which is used for cooling being guided from one device to the next and the coolant medium heating further in each device.

11 Claims, 3 Drawing Sheets

METHOD FOR ENERGY USAGE WHEN COOLING EXTRUSION PROFILES

This application is the U.S. National Stage of International Application No. PCT/EP2008/064081, filed Oct. 17, 2008, which designates the U.S., is published in German, and claims priority under 35 U.S.C. §§119 or 365(c) to German Application No. 10 2007 050 949.0, filed Oct. 23, 2007.

The invention relates to a method for energy usage when cooling extrusion profiles, preferably pipes, in which energy in the form of heat is supplied to melt the plastics material and, after shaping has taken place at least in the devices comprising the die, the calibrating unit and the cooling bath, heat is extracted again from the plastics material until the latter is self-supporting.

During extrusion, melted plastics compound is forced through an extrusion die by means of an extruder, whereby the desired shape is imparted to the plastics material. For this purpose, the plastics material is first melted by supplying heat and then the extruded plastics profile is cooled until it is dimensionally stable. Greatly cooled water, generally in the range around 15° C., is usually used for this purpose, with the extruded pipe being fed to a corresponding cooling bath or a cooling zone as soon as it leaves the extrusion die. Until the plastics pipe has become dimensionally stable, it must pass through a corresponding zone, in which the plastics profile must be permanently cooled. Since, however, the temperature of the plastics compound progressively decreases, it is also necessary to work with correspondingly cold cooling medium. To keep the cooling medium at a sufficiently low temperature level, it is necessary to expend a high amount of energy.

Such systems consequently have the disadvantage that energy is first required to melt the plastics material, but then energy still also has to be provided because the heated plastics compound must be cooled down again for the purpose of dimensional stabilization.

The object of the present invention is therefore to offer a method by means of which the energy usage, in particular for cooling the extrusion profiles, preferably pipes, can be reduced and, in addition, an improved temperature level of the waste heat is achieved.

In conjunction with the preamble of claim 1, the solution achieving the object is characterized in that, for cooling, a cooling medium passes through the extrusion line counter to the direction of extrusion, the medium that is used for cooling being passed from one device to the next, and the cooling medium heating up again in each device. This is because tests have shown that adequate dimensional stabilization is achieved after the extrusion process if there is a sufficient temperature difference between the relatively hot extrudate and the cooling medium. It is not necessary for this difference to be extremely great. The invention therefore approaches the matter where the greatest efficiency can be achieved. Within the extrusion line, the profile or pipe cools, or is progressively cooled down, and thereby loses heat. Consequently, in order to have the necessary temperature difference between the profile and the cooling medium, a cooling medium with the lowest temperature in absolute terms is required toward the end of the extrusion line, whereas a much warmer cooling medium is sufficient to achieve the required temperature difference between the plastics compound and the cooling medium at the beginning of the extrusion line. For this reason, the cold cooling medium is introduced at the end of the extrusion line and is used for cooling counter to the direction of extrusion, in the direction of the extrusion die, since, as mentioned above, a cooling medium heated up in the course of the process undoubtedly has a sufficient temperature difference at the next station.

In this respect, it is provided that the individual devices through which the cooling medium flows are arranged one behind the other in series or in a row.

Depending on the application area, the temperature of the cooling medium may be set such that the temperature difference between the cooling medium and the plastics profile remains constant to the greatest extent in each of the devices to be passed through; in any event, it can be ensured that the difference does not go below a predetermined value. Therefore, care is taken to ensure that sufficient cooling of the plastics profile is realized in each of the devices.

By this method, once it has cooled down, the cooling medium is used in the entire extrusion line without any further intermediate cooling, whereby the energy to be provided for cooling is reduced by 30-90%, preferably 50-80%, in particular 70-80%. The reduction comes into effect in particular in the pumping energy and/or the refrigerating machine output. The temperature difference increases from conventionally 5 degrees to an average of 35 degrees and, as a result, there is a reduction in the volumetric flow by a factor of 7 (35/5) for the same energy content and an increase in the proportion of free cooling, whereby the energy-intensive use of the refrigerating machine can likewise be reduced by a multiple. The proportion is dependent on the variation in outside temperature.

In addition, there is also an increase in the possibility of using the remaining waste heat of the cooling water, as a result of which the remaining waste heat of the cooling water is advantageously used for heating or hot water preparation.

Tests have shown that the temperature of the cooling water after it has passed through the process lies between 30 and 70° C., preferably at 50° C.

The principle of the invention is schematically illustrated in the drawings.

Figure 1:
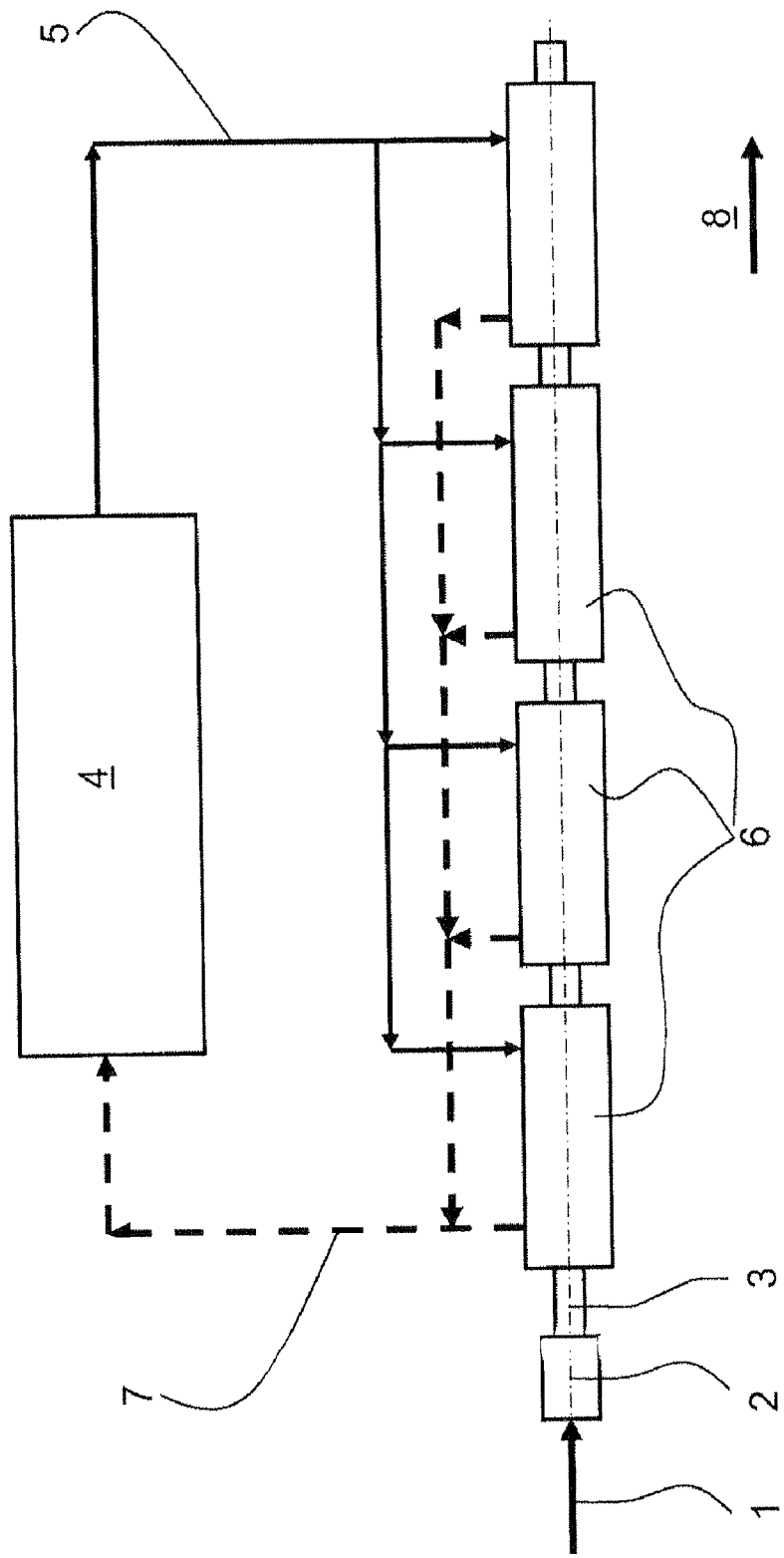
FIG. 1 shows the prior art

In FIG. 1, the cooling process is schematically illustrated on the basis of a pipe extrusion line according to the prior art. The melt 1 produced by an extruder is sent to a die 2, through which the melt 1 is forced, whereby a pipe 3 is obtained. For dimensional stabilization, the pipe 3 produced passes through various cooling stations 6. Each of the cooling stations 6 is connected to a cooling line 5, which is directly fed by a refrigerating machine 4, usually by a cooling tower. Consequently, each of the cooling stations 6 is fed the one cooling medium at largely the same temperature, for example water at 15° C. Each individual cooling station is connected to the return 7, into which the cooling water is introduced after it passes through each of the individual cooling stations 6. The cooling water heats up, for example, in each cooling station 6 by 3-8° C. and so enters the return 7 at a temperature of, for example, 20° C. The same takes place analogously in each further cooling station 6, so that the refrigerating machine/cooling tower 4 is sent the entire cooling water at a temperature here of approximately 20° C. The direction of extrusion is illustrated by the arrow 8.

The temperature difference between the flow and the return is correspondingly very small (here 5° C.), the required cooling medium flow correspondingly high. Furthermore, on account of the low temperature level of the return (here 20° C.), the proportion of energy-intensive cooling provided by refrigerating machines is extremely high and the proportion of cooling provided by the very energy-efficient cooling tower (free cooling) is very low.

Figure 2:
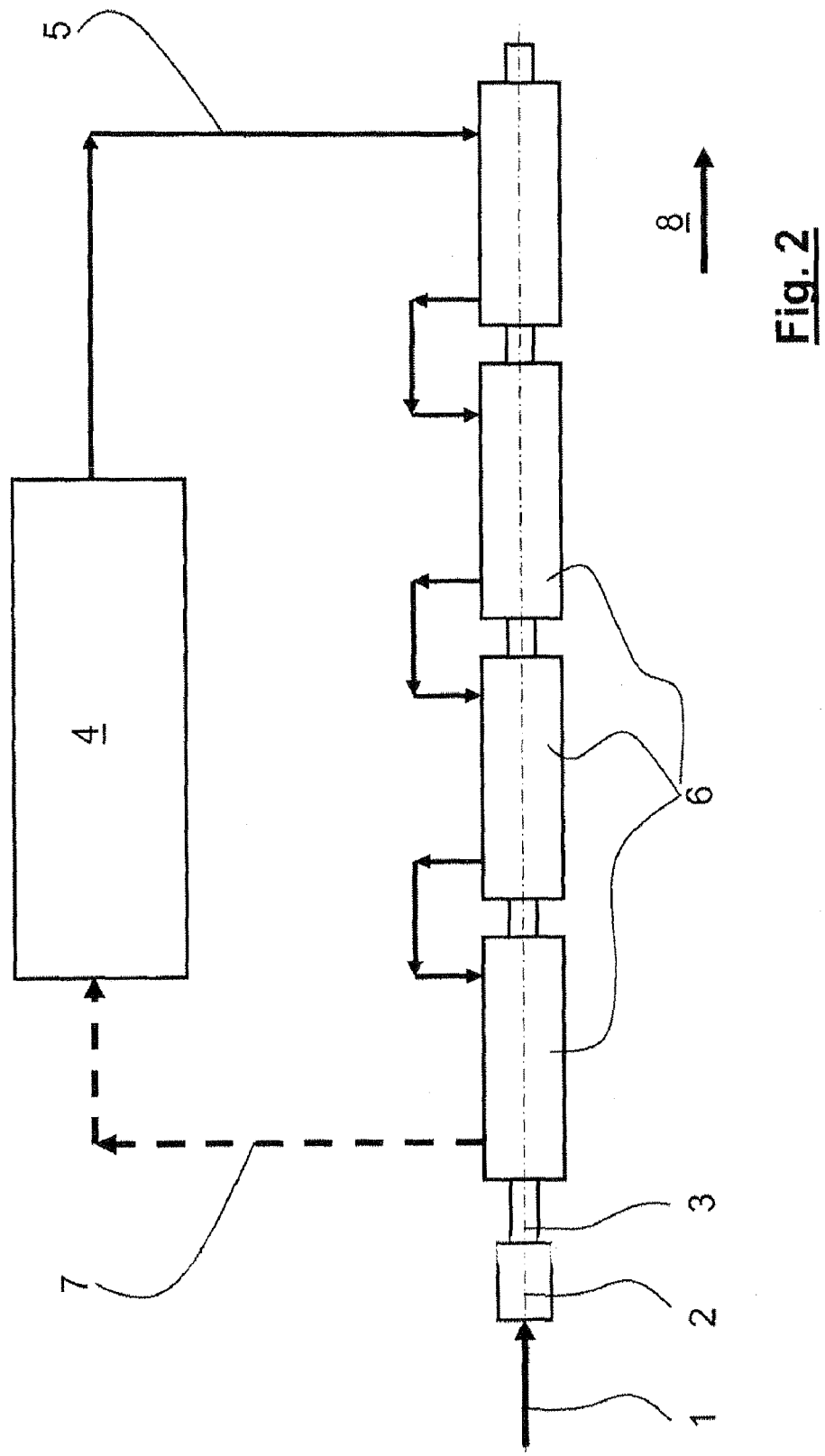
FIG. 2 shows the procedure according to the invention.

In FIG. 2, the principle of the invention is illustrated. It shows in turn a pipe extrusion line, in which melt 1 produced by an extruder is sent to a die 2, through which the melt 1 is forced, whereby a pipe 3 is obtained. For dimensional stabilization, here, too, the pipe 3 produced passes through various cooling stations 6. Each of the cooling stations 6 is connected to a cooling line 5. The decisive difference in comparison with conventional cooling is that the cooling medium is first introduced into the cooling station 6 furthest away from the die 2, counter to the direction of extrusion 8, and then does not enter a return 7 but is sent to the next cooling station 6, seen counter to the direction of extrusion 8. This progression into the next cooling station 6 is repeated until the cooling station 6 directly downstream of the die 2 has been passed through. Only then does the cooling medium enter the return 7 and is then sent again to the refrigerating machine/cooling tower 4. According to this procedure, the cooling water heats up, for example, from 15° C. to, for example, 25° C., the pipe 3 in the last cooling station having a temperature of 40° C. In the cooling station 6 lying upstream thereof, the pipe still has, for example, a temperature of 80° C., which is then cooled by the cooling water of 25° C. from the last cooling station 6. In order to continue this sequence of temperatures given by way of example, consequently, water of 15° C. is used to cool a pipe 3 from 80° C. to 40° C. and heats up to 25° C. The 25° C. warm water cools a 120° C. hot pipe 3 to 80° C. and thereby heats up to 35° C. In the next cooling station, this water cools a pipe 3 from 160° C. to 120° C. The temperature of the water thereby increases to 45° C. When it cools the pipe 3 leaving the die 2 with a temperature of 200° C. to 160° C., the temperature of the water increases to around 55° C., which water is then sent via the return 7 to the refrigerating machine/cooling tower 4 for renewed cooling down.

As a result, the temperature difference between the flow and the return increases in this example from 5° C., according to the prior art, to 40° C., as in the exemplary embodiment according to the invention. As a result, several effects occur:

The required volumetric flow (and consequently the required pumping power) of the cooling medium reduces in the same ratio as the temperature difference increases (in this example therefore by a factor of 8).

The increased return temperature allows greater use of cooling towers, known as free cooling, which can be operated without the need for refrigerating machines. If, for example, the limit temperature of the free cooling is 20° C. (the limit temperature is usually several degrees above the average temperature of the surroundings or the groundwater), in this example ⅞ of the required cooling capacity can be provided by means of free cooling. In the prior art represented, this proportion was 0.

The high temperature level of the return additionally allows the waste heat from the process of cooling the plastic pipes to be used. This is so because it is only when the temperature level is well above the ambient temperature that it is meaningful in energy terms and justifiable in economic terms to make the waste heat usable. This is in any event the case with 55° C., for example. Use for heating rooms, hot water or horticultural establishments are examples.

Figure 3:
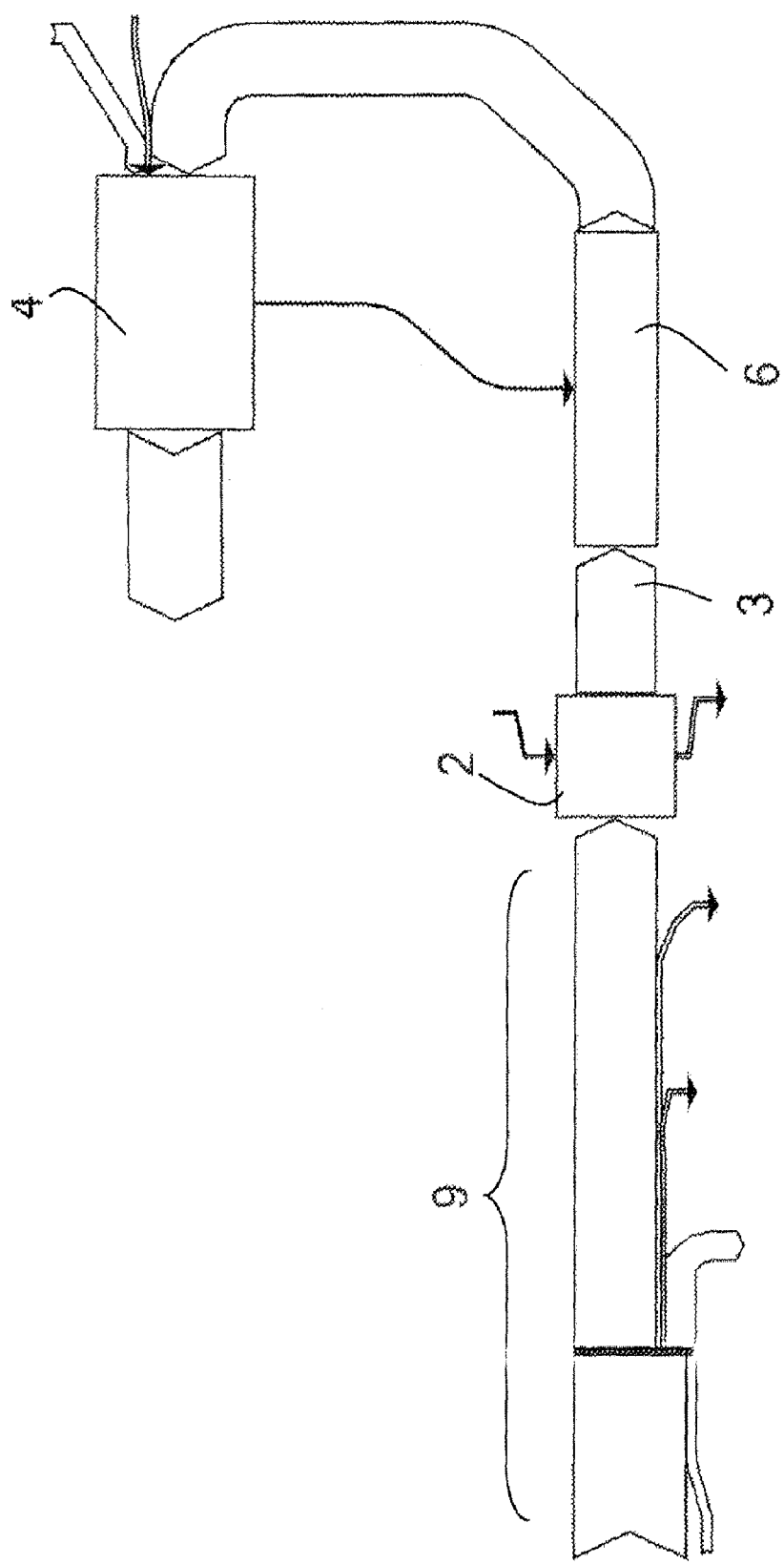
FIG. 3 shows the energy flow

The diagram represented in FIG. 3 represents the basic energy flow in the process, the width of the arrows respectively depicted symbolizing the amounts of energy. Consequently, illustrated in the region 9 is the process of melting the plastics material, in which about 80% of the energy provided remains in the extruded pipe 3. Part is lost in the form of radiation at the die 2, at the barrel, at the feed throat or through drive losses, which is illustrated by the arrows depicted in variously small sizes. The energy still remaining, primarily thermal energy, must be extracted from the plastics pipe in the cooling or vacuum baths 6. The energy transferred to the cooling medium must in turn be extracted from the cooling medium in the refrigerating machine/cooling tower 4.

One aspect of the invention is to use this type of cooling to increase the energy density and return temperature correspondingly and thereby improve this required re-cooling in energy terms, to reduce significantly the energy requirement of the re-cooling of the cooling medium and to make it possible for the thermal energy that is stored in the cooling medium to be put to use as a result of the higher energy level of the return of the cooling medium.

With the method according to the invention, the entire temperature level is increased, whereby the waste heat is made suitable for a use based on its energy. Effective reduction of the use of energy when cooling in extrusion, in particular pipe extrusion, is possible.

LIST OF DESIGNATIONS

1 Melt
2 Die
3 Pipe
4 Refrigerating machine
5 Cooling line
6 Cooling station
7 Return
8 Direction of extrusion
9 Melting region

The invention claimed is:

1. A method for energy usage when cooling extrusion profiles comprising,
    supplying energy in the form of heat to melt plastic material and, shaping the plastic at least in devices comprising a die, a calibrating unit and multiple individual cooling stations extending in a downstream direction of extrusion from the die in series, where heat is extracted from the shaped plastic material until the shaped plastic is self-supporting by,
    passing a cooling medium counter to the direction of extrusion into a furthest away cooling station from the die,
    passing the cooling medium from the furthest away cooling station in an upstream direction sequentially through upstream cooling stations in series, and
    the cooling medium heating up to a different temperature in each cooling station.

2. The method as claimed in claim 1 further comprising ensuring that the temperature difference between the cooling medium and the plastic material remains constant in particular cooling stations and does not go below a predetermined value.

3. The method as claimed in claim 1 further comprising reducing the energy to be provided for cooling by 30-90%.

4. The method as claimed claim 1 further comprising reducing at least one of pumping energy and refrigerating machine output by 30-90%.

5. The method as claimed in claim 1 further comprising using waste heat of the cooling medium for heating and/or hot water preparation.

6. The method as claimed in claim 1 further comprising maintaining temperature of the cooling medium after passing through the cooling stations between 30° and 70° C.

7. The method of claim 1 further comprising reducing energy provided for cooling by 50%-80%.

8. The method of claim 1 further comprising reducing energy provided for cooling by 70%-80%.

9. The method of claim 1 further comprising reducing at least one of pumping energy and refrigerating machine output by 50%-80%.

10. The method of claim 1 further comprising reducing at least one of pumping energy and refrigerating machine output by 70-80%.

11. The method of claim 1 further comprising maintaining temperature of the cooling medium after passing through the cooling stations at 50° C.

* * * * *